(12) United States Patent
Takahashi (10) Patent No.: US 7,406,823 B2
(45) Date of Patent: Aug. 5, 2008

(54) EXHAUST GAS THROTTLE VALVE FOR ENGINES

(75) Inventor: Hideki Takahashi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 374 days.

(21) Appl. No.: 11/101,605

(22) Filed: Apr. 8, 2005

(65) Prior Publication Data

US 2006/0048505 A1   Mar. 9, 2006

(30) Foreign Application Priority Data

Apr. 9, 2004   (JP) .............................. 2004-114981

(51) Int. Cl.
- *F01N 7/00* (2006.01)
- *F01N 3/00* (2006.01)
- *F02D 9/08* (2006.01)

(52) U.S. Cl. ............................ 60/324; 60/292; 123/337

(58) Field of Classification Search ................... 60/292, 60/324; 251/305; 123/337
See application file for complete search history.

(56) References Cited

U.S. PATENT DOCUMENTS

| | | | | |
|---|---|---|---|---|
| 3,381,935 A | * | 5/1968 | Middler ....................... | 251/305 |
| 3,391,756 A | * | 7/1968 | Rosenberg et al. .......... | 181/226 |
| 5,350,154 A | * | 9/1994 | Takama et al. .............. | 251/305 |
| 5,355,673 A | * | 10/1994 | Sterling et al. ............... | 60/324 |
| 5,406,790 A | * | 4/1995 | Hirota et al. .................. | 60/276 |
| 6,076,499 A | * | 6/2000 | Klumpp ....................... | 123/337 |
| 6,711,892 B2 | * | 3/2004 | Tamura et al. ................ | 60/277 |
| 6,966,179 B2 | * | 11/2005 | Onodera et al. .............. | 60/295 |
| 7,216,479 B2 | * | 5/2007 | Tamura ........................ | 60/285 |

FOREIGN PATENT DOCUMENTS

| | | |
|---|---|---|
| JP | 1-187326 | 7/1989 |
| JP | 1-127942 | 8/1989 |
| JP | 11-132060 | 5/1999 |
| JP | 2000-2125 | 1/2000 |
| JP | 2000-170551 | 6/2000 |
| JP | 2003-343287 | 12/2003 |

* cited by examiner

*Primary Examiner*—Thomas Denion
*Assistant Examiner*—Loren Edwards
(74) *Attorney, Agent, or Firm*—McGinn IP Law Group, PLLC (57) ABSTRACT

An exhaust gas throttle valve disposed in the exhaust system of an engine, wherein the center axis of rotation of a valve shaft 5 is set at a position deviated from the center axis of the exhaust gas passage, and two recessed portions 11 are symmetrically formed in the circumferential portion of a valve body 4 by cutting the surface thereof. The positions where the recessed portions 11 are formed are on the side of the center axis of the exhaust gas passage beyond the center axis 12 of rotation, and at where the peripheral portion of the valve body 4 faces the edge portions 9 where insertion holes 8 for the valve shaft 5 are opened in the exhaust gas passage. At these positions, the distance is a minimum between the peripheral portion of the valve body 4 and the edge portions 9. The recessed portions 11 work to increase the gap relative to the edge portions 9 at that positions. It is therefore made possible to approximate the peripheral portion of the valve body 4 to the tubular wall of the exhaust gas passage 2 when the exhaust gas throttle valve is closed preventing the valve body 4 and the edge portions 9 from coming in contact together despite of the thermal expansion.

8 Claims, 7 Drawing Sheets

CROSS
SECTION A-A

EXHAUST GAS THROTTLE VALVE FOR ENGINES

BACKGROUND OF THE INVENTION

1. Field of the Invention

The present invention relates to a structure of an exhaust gas throttle valve provided in the exhaust system of an engine, such as a throttle valve disposed on the downstream of a device for purifying the exhaust gases of a diesel engine or an exhaust brake valve for assisting the braking force during the deceleration operation of a vehicle.

2. Description of the Related Art

As an important way to protect the environment, regulations have now been legislated for reducing pollution components contained in the exhaust gases emitted from the engines for vehicles, and a variety of technologies have been vigorously developed to reduce pollution components. In particular, the regulations against the exhaust gases of diesel engines are becoming stringent in recent years, and it is expected that more strict regulations will be legislated in the future. Diesel engines generally feature a higher thermal efficiency than that of the gasoline engines and emit carbon dioxide ($CO_2$) in smaller amounts correspondingly. However, it has still been strongly demanded to reduce the emission of particulate matter (PM) and nitrogen oxides (NOx).

In order to prevent the emission of the particulate matter, there has been proposed a device for purifying the exhaust gases by mounting a filter called diesel particulate filter (DPF) in the exhaust system of a diesel engine to trap the particulate matter. The DPF usually comprises a ceramic body such as porous cordierite in which a number of fine passages are formed in the axial direction, the inlets and outlets of the neighboring passages being alternately closed. The exhaust gases of the diesel engine flow toward the downstream passing through the porous ceramic walls between the neighboring passages whereby the particulate matter in the form of fine particles is trapped. As the device for purifying the exhaust gases, the so-called continuously regenerating DPF is drawing attention in recent years. In this device, an oxidizing catalyst is disposed on the upstream of the DPF, the unburned components in the exhaust gases are oxidized to elevate the temperature of the exhaust gases, thereby to continuously oxidize and remove the particulate matter trapped by the DPF for preventing the choke of the DPF and regenerating the DPF while the engine is in operation.

In order for the catalyst in the continuously regenerating DPF to be activated and favorably regenerated, the exhaust gases must have been heated to an activating temperature that makes the catalyst to activate, i.e., must have been heated to not lower than about 350° C. During the low-load operation of the diesel engine where the fuel is injected in small amounts, however, the temperature of the exhaust gases becomes considerably low. If this operating condition continues for extended periods of time, the temperature of the catalyst becomes lower than the activating temperature, and the particulate matter deposits on the DPF. Even in the continuously regenerating DPF, too, therefore, the particulate matter must often be removed by activating the catalyst by intentionally elevating the temperature of the exhaust gases. The above regeneration of the continuously regenerating DPF is hereinafter referred to as forced regeneration.

At the time of the forced regeneration, the fuel is fed to the exhaust system by such means as post-injection to inject the fuel in the exhaust stroke of the engine to elevate the temperature of the exhaust gases, and is oxidized and burned in the catalyst. There has further been proposed means for more elevating the temperature of the exhaust gases by providing an exhaust gas throttle valve on the downstream of the continuously regenerating DPF and squeezing the exhaust passage when the forced regeneration is to be executed, as disclosed in, for example, JP-A-2003-343287. Here, a diesel engine having an exhaust gas throttle valve disposed on the downstream of the continuously regenerating DPF will be described with reference to a schematic diagram of FIG. 8, and a concrete constitution of the exhaust gas throttle valve will be described with reference to FIG. 7.

Figure 8:
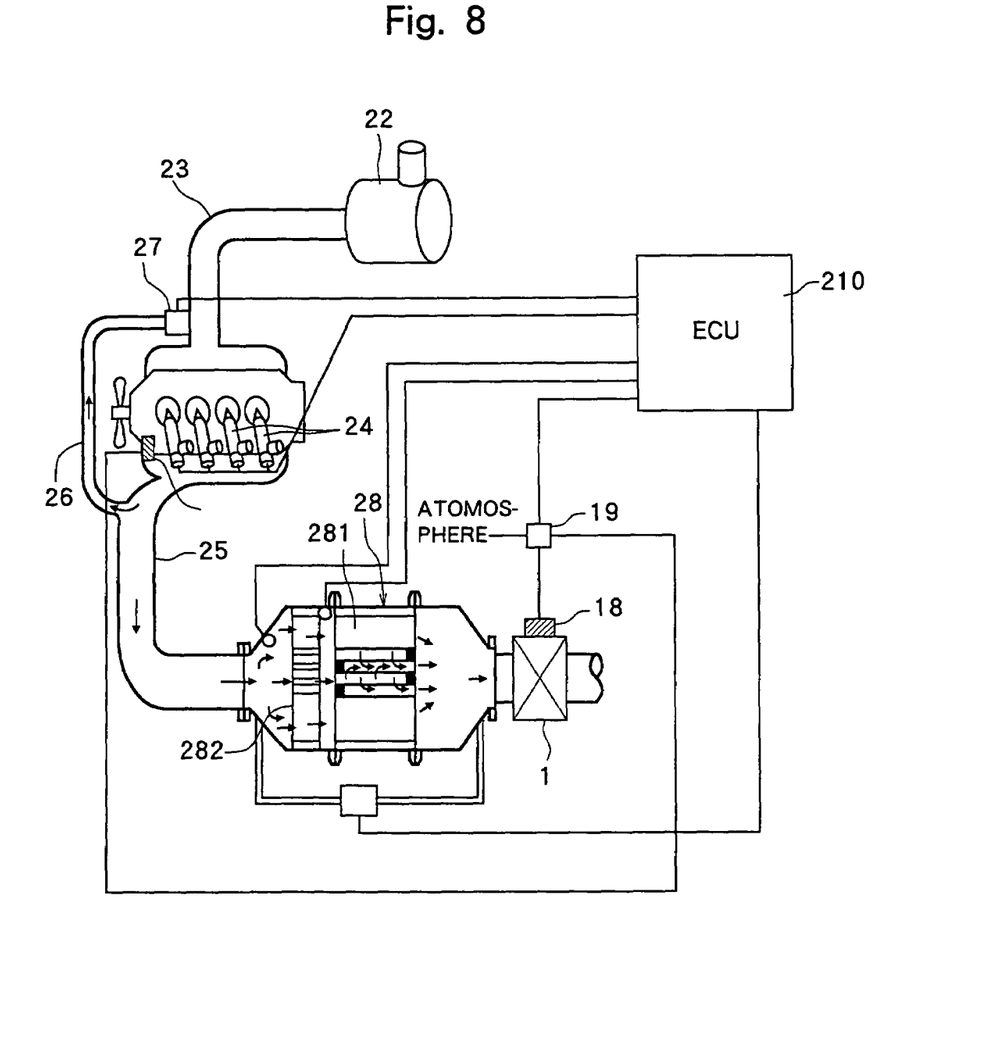
FIG. 8 is a diagram schematically illustrating a diesel engine to which the exhaust gas throttle valve is applied.

Referring to FIG. 8, the air is fed into the cylinders of a diesel engine body through an air cleaner 22 and an intake pipe 23. The fuel is injected into the cylinders from the fuel injection nozzles 24 at the end of the compression stroke, mixed with the compressed air, and burns in the cylinders to produce the power. The exhaust gases after burned are discharged into an exhaust pipe 25 and are partly recirculated into the intake pipe 23 through an EGR passage 26. The recirculation purposes chiefly for preventing the generation of NOx, and the amount of the exhaust gases recirculated is controlled by an EGR valve 27. In the exhaust pipe 25, for trapping the particulate matter in the exhaust gases, there is arranged a continuously regenerating DPF 28 equipped with a ceramic DPF 281 and an oxidizing catalyst 282 disposed on the upstream side. On the downstream of the continuously regenerating DPF 28, there is disposed an exhaust gas throttle valve 1 operated by a fluid pressure actuator 18. The exhaust gas throttle valve 1, by controlling the operation fluid introduced into the fluid pressure actuator 18 by using an electromagnetic valve 19, is maintained fully opened while the diesel engine is in operation.

In the continuously regenerating DPF 28, the oxidizing catalyst 282 is activated when the temperature of the exhaust gases from the diesel engine is not lower than a predetermined value, and the particulate matter trapped and deposited on the DPF 281 is oxidized with oxygen in the exhaust gases and is removed due to the exhaust gases elevated at a high temperature by the oxidizing action. When the diesel engine is operated with a low load for extended periods of time, however, the temperature of the exhaust gases drops, the activity of the oxidizing catalyst 282 drops, and the particulate matter is trapped and deposits in increased amounts. When the amount of deposition exceeds a predetermined amount, the temperature of the exhaust gases is elevated by such means as feeding the additional fuel by post-injection from the fuel injection nozzle 24 to perform forced regeneration of the DPF. The above control operation is executed by an instruction from an ECU 210 depending upon a pressure differential before and after the DPF 281, a temperature thereof, an engine rotational speed, etc.

In a low-load region of the engine where it is difficult to activate the catalyst even performing the post-injection, a operation is conducted to strongly squeeze the flow of the exhaust gases by decreasing the opening degree of the exhaust gas throttle valve 1 disposed on the downstream of the continuously regenerating DPF 28. This prevents the radiation of heat from the continuously regenerating DPF 28, the heat is retained therein, an increased load torque is exerted on the engine due to an increase in the engine exhaust gas pressure, the temperature of the exhaust gases is further elevated, and the oxidizing catalyst 282 is sufficiently activated to promote the regeneration of the DPF 281. Here, however, if the exhaust gas throttle valve 1 is squeezed, the operation of the diesel engine is seriously affected. Therefore, the forced regeneration which uses the exhaust gas throttle valve 1 in combination is so set as to be executed only when the vehicle is brought into a halt and the engine is in an idling state. In the foregoing was described the device for purifying the exhaust gases with the exhaust gas throttle valve 1 disposed on the downstream of the continuously regenerating DPF 28. However, the exhaust gas throttle valve 1 may be disposed on the upstream side as disclosed in JP-A-2003-343287 mentioned above.

Figure 7:
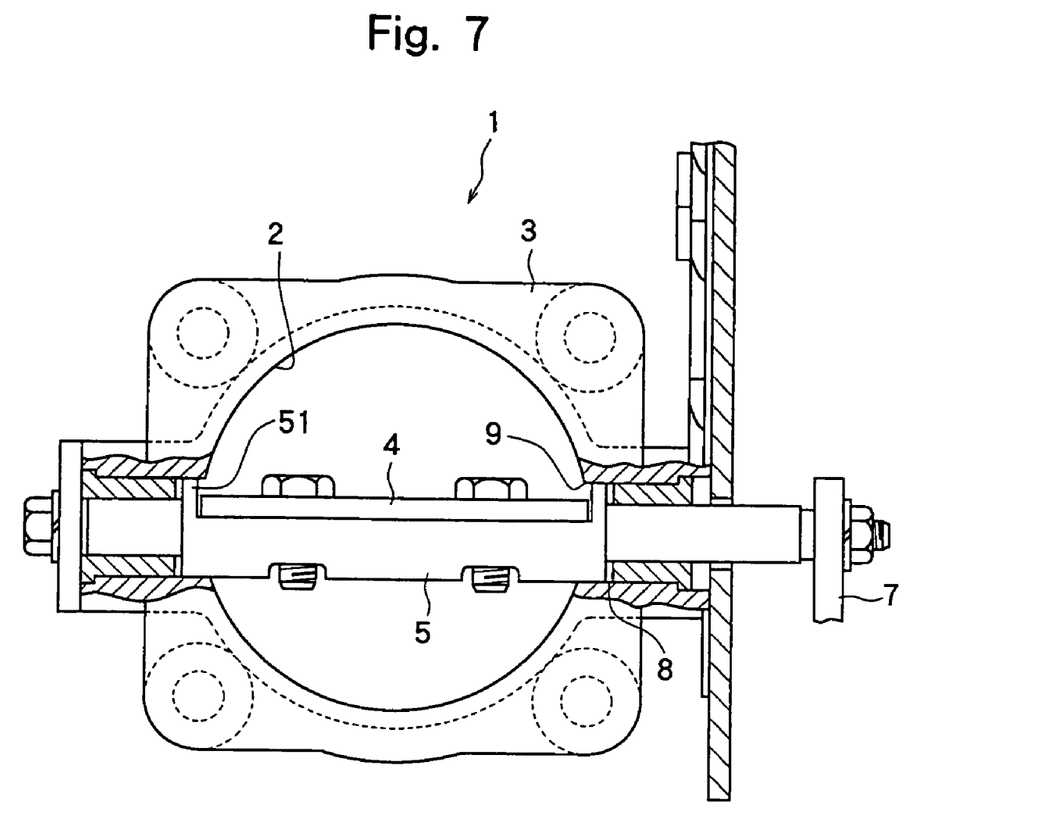
FIG. 7 is a view illustrating a conventional exhaust gas throttle valve.

Referring to FIG. 7, the exhaust gas throttle valve 1 is constituted as a butterfly valve arranged in an exhaust gas passage 2 of a valve casing 3. Insertion holes 8 for a valve shaft 5 are perforated in the walls of the exhaust gas passage 2, and both ends of the valve shaft 5 are fitted and supported therein via bushes. An intermediate portion of the valve shaft 5 penetrating through the exhaust gas passage 2 has a diameter greater than that at both ends thereof, and its upper portion is cut to form a flat surface over the whole width of the exhaust gas passage 2. Therefore, flanges 51 are formed among the intermediate portion of the valve shaft 5 and both ends thereof. Further, edge portions 9 are formed on the wall of the passage at positions where the insertion holes 8 for the valve shaft 5 are opened in the exhaust gas passage 2.

A plate-like valve body 4 of the butterfly valve is secured by bolts 6 to the flat surface of the intermediate portion of the valve shaft 5. The valve body 4 is of an elliptic shape close to a circular shape on a plan view, and the circumferential portion thereof comes nearly in agreement with the tubular wall of the exhaust gas passage 2 when the valve is closed. This figure illustrates fully opened state of the valve. To close the valve, the valve shaft 5 is turned by, for example, about 75 degrees by a link 7 coupled to the hydraulic pressure actuator to bring the circumferential portion of the valve body 4 close to the tubular wall of the exhaust gas passage 2. Here, however, the exhaust gas passage 2 is not completely closed even when the valve is at the fully closed position; i.e., a small gap is maintained between the circumferential portion of the valve body 4 and the tubular wall of the exhaust gas passage 2 enabling the diesel engine to be operated at the time when the DPF is to be forcibly regenerated.

Such exhaust gas throttle valve is used not only in combination with the continuously regenerating DPF but also as an exhaust brake valve as has been traditionally used, as disclosed in JP-A-11-257104. That is, many heavy duty trucks mounting diesel engines and having large gross vehicle weights are equipped with an exhaust brake valve of a similar constitution which works to greatly squeeze the exhaust gas during the deceleration, so that the load torque that acts on the diesel engines increases to assist the braking force during the deceleration of the vehicles for safety.

SUMMARY OF THE INVENTION

As described above, the particulate matter tapped by the continuously regenerating DPF can be effectively oxidized and removed by elevating the temperature of the exhaust gases by injecting the additional fuel in combination with the use of the exhaust gas throttle valve. However, the exhaust gas throttle valve provided in the exhaust pipe is exposed to the exhaust gases of high temperatures at all times and its constituent parts undergo the thermal expansion. During the forced regeneration of the DPF, in particular, the additional fuel is oxidized and burns in the exhaust system, whereby the temperature of the exhaust gases becomes higher than that of when the diesel engine is ordinarily operated. Besides, the particulate matter deposited on the DPF burns. Accordingly, the temperature on the downstream of the continuously regenerating DPF is further elevated and sometimes exceeds 600° C. Therefore, a very large quantity of heat affects on the exhaust gas throttle valve disposed on the downstream of the continuously regenerating DPF, and the thermal expansion of the constituent parts becomes to a serious degree.

Further, if the diesel engine is operated while closing the exhaust gas throttle valve at the time of forcibly regenerating the DPF, the exhaust gas pressure increases on the upstream of the exhaust gas throttle valve. The high pressure exhaust gas vigorously flows out through the gap between the circumferential portion of the valve body of the exhaust gas throttle valve and the tubular wall of the exhaust gas passage, so that a large noise is made from the circumference of the exhaust gas throttle valve accompanied by a pressure drop of the exhaust gas. The noise can be decreased considerably in case that the continuously regenerating DPF exists on the downstream of the exhaust gas throttle valve. When the exhaust gas throttle valve is disposed at the downstream of the continuously regenerating DPF, however, a decrease in the noise by the continuously regenerating DPF cannot be expected.

In order to decrease the amount of the exhaust gases that flow between the valve body and the tubular wall of the exhaust gas passage, and consequently, to decrease the noise as small as possible, it can be contrived to perforate communication holes in the valve body of the exhaust gas throttle valve, so that the exhaust gases are discharged through the communication holes when the diesel engine is in operation while closing the exhaust gas throttle valve. For this purpose, the circumferential portion of the valve body must be brought close to the tubular wall of the exhaust gas passage when the valve is closed to minimize the gap therebetween as much as possible.

However, the amounts of thermal expansion taking place in the each constituent parts of the exhaust gas throttle valve is not same amounts. That is, the exhaust gases of high temperatures are flowing at all times around the valve body of the exhaust gas throttle valve, on the other hand, the atmosphere of normal temperature is existing on the outer side of the valve body in which the exhaust gas passage is formed. Therefore, even if they are made of the same material, there exists a difference in the amount of thermal expansion due to a difference in the temperature and, hence, the gap between the circumferential portion of the valve body and the tubular wall of the exhaust gas passage gradually decreases with an increase in the temperature of the exhaust gases. If the valve body is designed to be brought close to the tubular wall of the exhaust gas passage to decrease the noise, they become in contact together (so-called biting) when they are thermally expanded, and the valve body may be stuck.

When the diesel engine is normally operating, the exhaust gas throttle valve must be maintained fully opened. In many exhaust gas throttle valves, therefore, the center axis of rotation of the valve shaft to which the valve body is attached is set to be deviated from the center axis of the exhaust gas passage, so that the total force based on the pressure of the exhaust gases exerts on the valve body at all times in a direction for the valve to be opened. In this case, the pressure center of the exhaust gases exerting on the valve body is at a point where the valve body intersects the center axis of the exhaust gas passage, i.e., almost the central point of the elliptic shape of the valve body. Therefore, the valve body is fixed to the valve shaft in a manner where the central point thereof is slightly deviated from the center axis of rotation. Upon being fixed as described above, the gap between circumferential portion of the valve body and the edge portions where the valve shaft insertion holes are opened in the exhaust gas passage, becomes different on both sides of the center axis of rotation; i.e., the gap becomes narrow on the side where there exists the center point of the valve body.

The present invention relates to an exhaust gas throttle valve in which the center axis of rotation of the valve shaft to which the valve body is attached is set being deviated from the center axis of the exhaust gas passage, so that the total force based on the pressure of the exhaust gas exerts on the valve body of the exhaust gas throttle valve in a direction in which it opens at all times. And the purpose of the present invention are to prevent the valve body from coming in contact with the tubular wall of the exhaust gas passage even in case the exhaust gas throttle valve is thermally expanded due to the exhaust gases of high temperatures and to avoid such an occurrence that the valve body is stuck and becomes incapable of operating. The valve stick problem exists not only in the exhaust gas throttle valve which is combined with the continuously regenerating DPF but also in the exhaust gas throttle valve which is provided as an exhaust brake.

In view of the above purpose, it is an object of the present invention to prevent the valve body from coming in contact with the tubular wall of the exhaust gas passage despite of the thermal expansion, and to form recessed portions, in the surface of the valve body of the exhaust gas throttle valve, at positions where the circumferential portion of the valve body comes closest to the tubular wall.

Namely, the present invention is concerned with an exhaust gas throttle valve disposed in the exhaust system of an engine, comprising, a valve casing having an exhaust gas passage of a circular shape in cross section through which the exhaust gases flow, an insertion holes of a circular shape in cross section formed in the wall portion of said exhaust gas passage, a rotary valve shaft fitted into said insertion holes and is penetrating through said exhaust gas passage, the center axis of rotation of said valve shaft is set at a position deviated from the center axis of said exhaust gas passage, and, a plate-like valve body attached to said valve shaft having two recessed portions symmetrically formed in said valve body by cutting the surface of said valve body at positions facing the edge portions where said insertion holes are opened in said exhaust gas passage, said two recessed portions being formed in the circumferential portion of said valve body on the side of said center axis of said exhaust gas passage beyond said center axis of rotation.

The above constitution makes the exhaust gas throttle valve of the present invention to exhibit the following function and effect.

In the exhaust gas throttle valve to which the present invention is applied, the center axis of rotation of the valve shaft is set to a position deviated from the center axis of the exhaust gas passage so that the torque acts in a direction for the exhaust gas throttle valve to be opened when the diesel engine is normally operating. The exhaust gas throttle valve is such that the center of the elliptic valve body is fixed at a position deviated from the center axis of rotation, and the gap between the circumferential portion of the valve body and the tubular wall of the exhaust gas passage becomes different on both sides of the center axis of rotation. In the present invention, two recessed portions are symmetrically formed in the circumferential portion of the valve body by cutting the surface of the valve body at positions facing the edge portions where the insertion holes for the valve shaft are opened in the exhaust gas passage on the side where the gap becomes smaller, i.e., on the side of the center axis of the exhaust gas passage beyond the center axis of rotation.

The distance between a point on circumferential portion of the valve body and the opposing tubular wall of the exhaust gas passage becomes smaller as the point on circumferential portion approaches the center axis of rotation. The position of the recessed portion is the one where the distance becomes the smallest between the circumferential portion and the edge portion throughout the whole circumference of the valve body, and is, hence, the position where the valve body and the edge portions become most likely to come in contact with each other in case the exhaust gas throttle valve is thermally expanded due to the exhaust gases of a high temperature. In the present invention, recessed portions are formed in these positions to increase the gap and, hence, to avoid the probability of contact caused by the thermal expansion. This makes it possible to carry out the designing to minimize the gap as a whole between the circumferential portion of the valve body and the tubular wall of the exhaust gas passage. This decreases the amount of the exhaust gases flowing around the circumference of the valve body when the exhaust gas throttle valve is closed and decreases the noise that generates. Besides, the above effect is obtained by a simple machining of cutting the surface of the valve body without boosting the cost of production substantially.

It is desirable as described in claim 2 that the recessed portions are so shaped that the depth is a maximum at points where the circumferential portion of the valve body faces the edge portions. When the recessed portions are formed in this shape, the above-mentioned effect is achieved most effectively, and the gap as a whole can be minimized between the circumferential portion of the valve body and the tubular wall of the exhaust gas passage.

As described in claim 3, to maintain an exhaust gas flow passage, communication holes may be perforated in the valve body on the side opposite to the center axis of the gas flow passage with the center axis of rotation as a center. When the communication holes are perforated, the exhaust gas flow passage can be maintained when the valve is closed, even when the gap as a whole is decreased between the circumferential portion of the valve body and the tubular wall of the exhaust gas passage.

A large quantity of heat is exerted on the exhaust gas throttle valve at the time of forced regeneration when the exhaust gas throttle valve is used in combination with the device for purifying the exhaust gases, that has a catalyst and a diesel particulate filter for trapping the particulate matter in the exhaust gases. As described in claim 4, therefore, it is desired to use the exhaust gas throttle valve of the present invention as the exhaust gas throttle valve for a diesel engine equipped with the device for purifying the exhaust gases. In this case as described in claim 5, the invention exhibits the effect more efficiently when the exhaust gas throttle valve is disposed on the downstream of the device for purifying the exhaust gases.

In addition to the exhaust gas throttle valve used in combination with the device for purifying the exhaust gas, it is noted that the exhaust gas throttle valve according to the present invention can be adopted as an exhaust brake valve disposed in the exhaust system of the engine, that is used in heavy duty vehicles and that is so operated as to decrease the opening degree during the deceleration operation of the vehicle. The exhaust brake valve, too, is thermally expanding due to the exhaust gases of high temperatures. As described in claim 6, therefore, the present invention can be applied to the exhaust brake value to avoid the stick caused by the thermal expansion.

DETAILED DESCRIPTION OF THE INVENTION

An exhaust gas throttle valve of the present invention will now be described with reference to the drawings. Here, the invention is concerned with the exhaust gas throttle valve itself, and, the constitution and operation of a device for purifying the exhaust gases to which the exhaust gas throttle valve is applied are the same as those of FIG. 8, hence, they are not described here in detail. In the drawings of the exhaust gas throttle valve of the invention, further, the parts and devices corresponding to those of the prior art (FIG. 7) are denoted by the same reference numerals.

Figure 1:
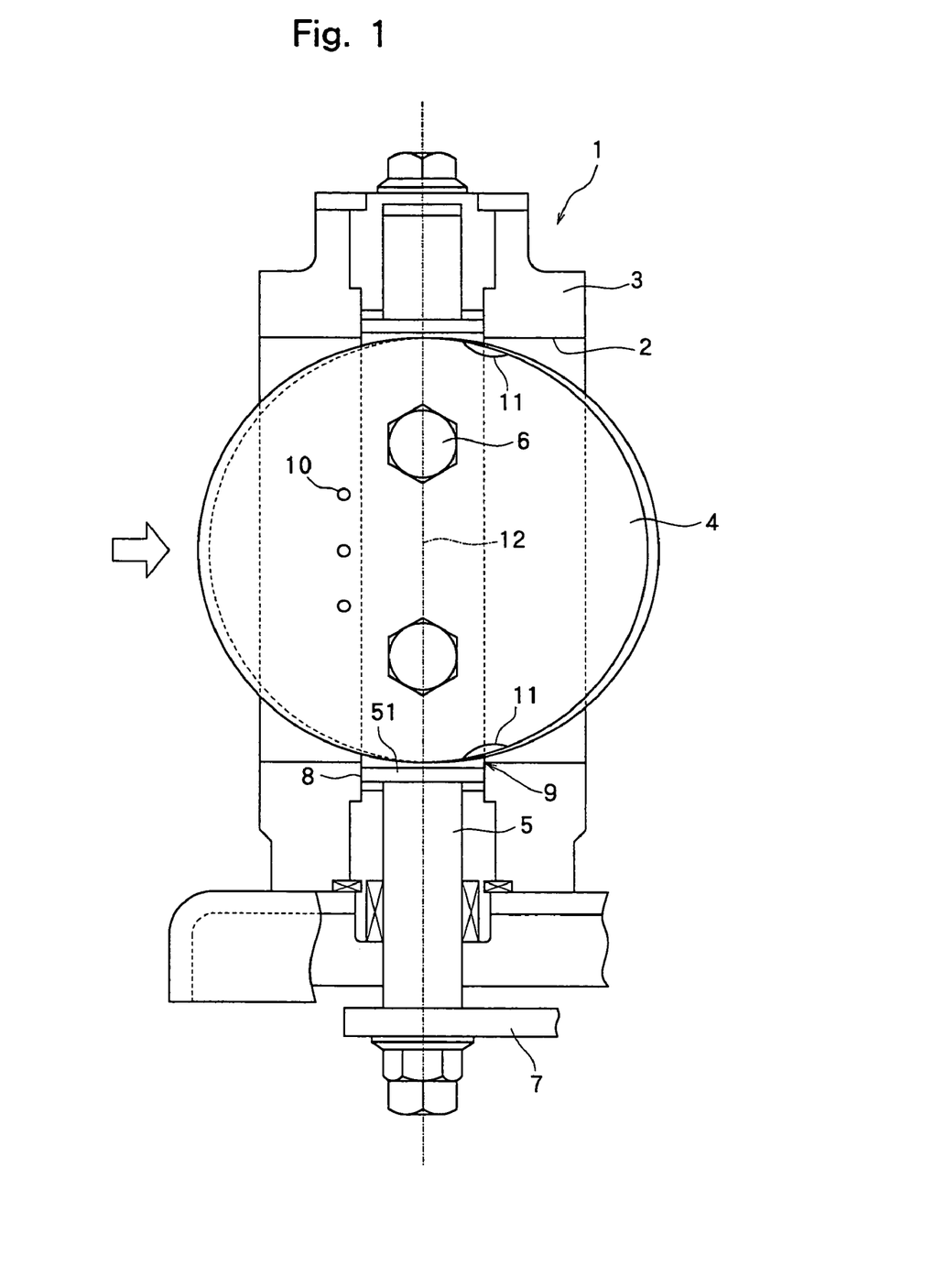
FIG. 1 is a sectional plan view of an exhaust gas throttle valve according to the present invention.
Figure 2:
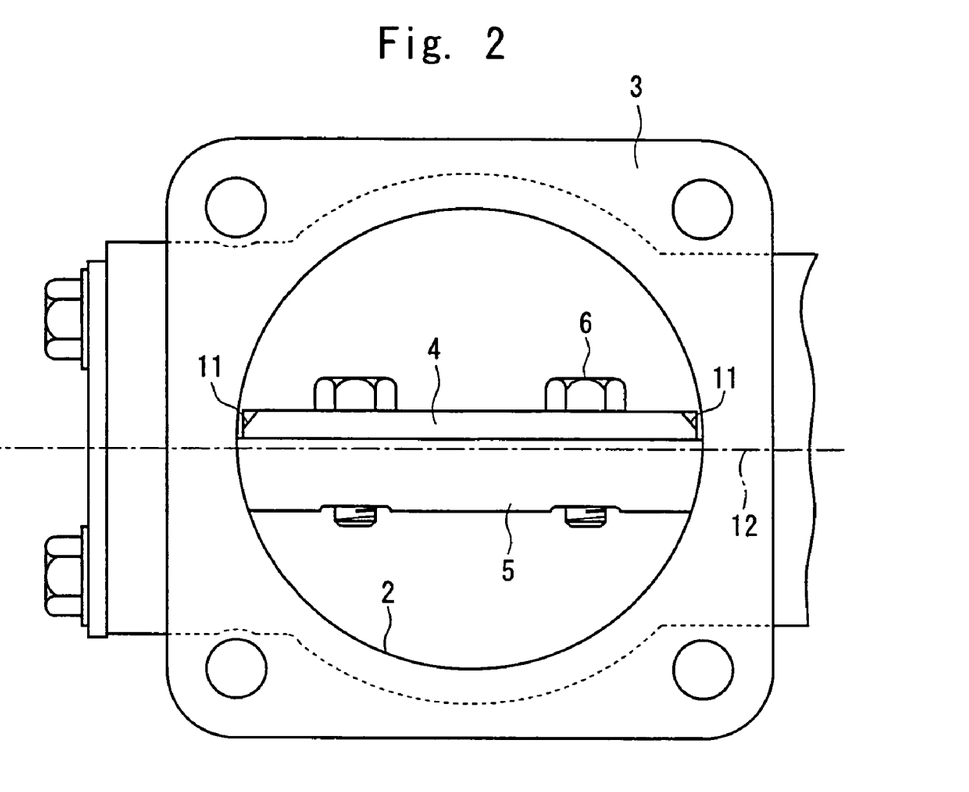
FIG. 2 is a sectional plan view of the exhaust gas throttle valve according to the present invention.

The exhaust gas throttle valve illustrated in FIGS. 1 and 2 is a butterfly valve arranged in a valve casing 3 in which an exhaust gas passage 2 is formed, like the one shown in FIG. 7. A valve shaft 5 to which a valve body 4 is attached has a shape which is the same as that of the valve shaft of FIG. 7, and has both end portions thereof fitted into insertion holes 8 formed in the valve casing 3. A valve shaft 5 has an intermediate flat surface to where the valve body 4 is fixed, and further has flange portions 51 among the flat surface and both end portions thereof. Portions where the insertion holes 8 are opened in the exhaust gas passage 2 for inserting the valve shaft 5, are forming edge portions 9. FIGS. 1 and 2 are views illustrating a state where the exhaust gas throttle valve is fully opened. When the DPF is being forcibly regenerated, the temperature of the exhaust gases is elevated by burning the additional fuel, and the valve body is brought to a closed position depending upon the operating conditions. To the valve shaft 5 is coupled, via a link 7, a hydraulic pressure actuator equipped with, for example, a cylinder-piston mechanism. To close the exhaust gas throttle valve, a compressed air or the like is introduced into the hydraulic pressure actuator to turn the valve shaft 5.

Figure 4:
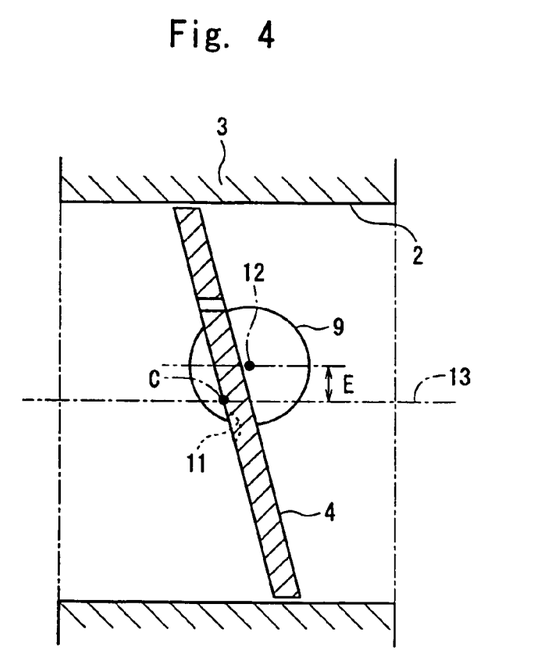
FIG. 4 is a drawing for explaining the operation of the exhaust gas throttle valve of the present invention.

According to the present invention, the center axis 12 of rotation of the valve shaft 5 is set at a position separated away from a point C at which the center axis 13 of the exhaust gas passage 2 intersects the valve body 4, i.e., is set at a position separated away from a center point of the elliptic shape of the valve body 4. That is, referring to FIG. 4, the center axis 12 of rotation of the valve shaft 5 passes through a position offset from the enter axis 13 of the exhaust gas passage by a distance E. The total force of the exhaust gas pressure exerts on the point C at where the center axis 13 of the passage intersects the valve body 4. Being offset, therefore, a torque due to the exhaust gas pressure acts on the valve body 4 in a direction in which it opens. Therefore, the exhaust gas throttle valve is automatically opened even if it is closed due to some cause while the diesel engine is in normal operation. Though the offset E is enlarged in FIG. 4 for easy comprehension, the offset amount in practice is as small as about 1/20 to about 1/40 of the diameter of the exhaust gas passage 2.

Upon setting the center axis 12 of rotation of the valve shaft 5 being offset from the center axis 13 of the exhaust gas passage 2 as described above, the valve body 4 is attached to the valve shaft 5 in a manner that the center point C of the elliptic shape is at a position separated away from the center axis 12 of rotation by the offset amount. As a result, the distance between the circumferential portion of the valve body 4 and the edge portions 9 formed at portions where the insertion holes 8 for the valve shaft are opened in the exhaust gas passage 2, differs on both sides of the center axis 12 of rotation. Namely, as illustrated in detail in FIG. 6, the gap becomes narrower on the side where the center point C of the valve body 4 exists.

To decrease the noise that generates when the valve body 4 is closed, the gap between the valve body 4 and the tubular wall of the exhaust gas passage 2 must be decreased as small as possible. In order to maintain the amount of discharging the exhaust gas of the engine even when the gap is narrowed, according to the present invention, three communication holes 10 are perforated in the valve body 4. When the exhaust gas throttle valve is closed, most of the exhaust gases flow through the communication holes 10. The communication holes 10 are perforated near the central portion of the valve body 4 and have passage areas enough to flow. Therefore, very decreased noise generates when the exhaust gas throttle valve is closed as compared to that of when the exhaust gases flow only around the valve body 4.

Figure 5:
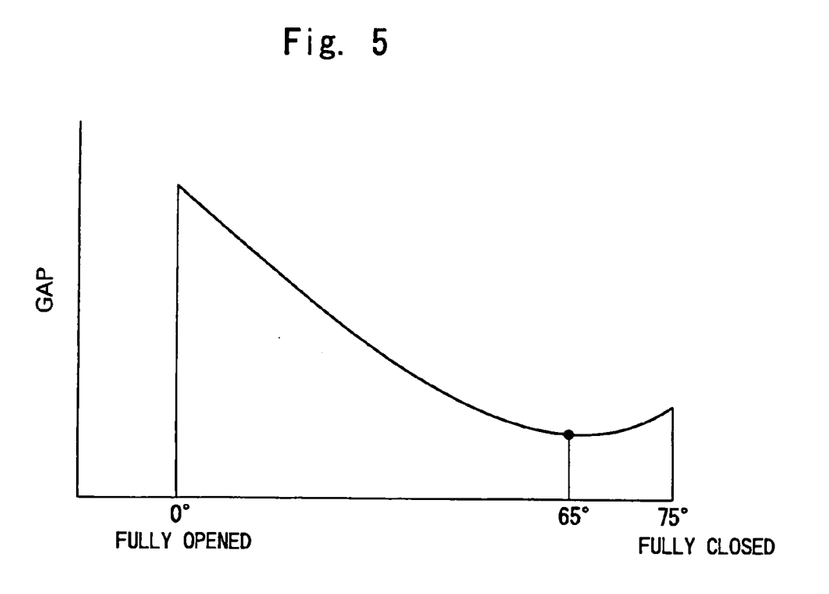
FIG. 5 is a graph illustrating a gap between the circumferential portion of the valve body and the edge portion.

The distance from a point on the circumferential portion of the valve body 4 to the tubular wall of the exhaust gas passage 2 decreases as the point on circumferential portion approaches to the center axis of rotation of the valve shaft 5. Therefore, the distance becomes the shortest at the position between the edge portion 9 of the tubular walls and the circumferential portion facing thereto. In fact, the edge portion 9 is formed on the tubular wall of a circular shape, so the distance (gap) between the circumferential portion and the edge portion 9, generally, varies as illustrated in FIG. 5 (though it may differ depending upon the thickness of the valve body 4), as the valve body 4 rotates from the fully opened position to the fully closed position, and the distance becomes a minimum near the fully closed position. Between both sides of the center axis 12 of rotation as described above, the distance is shorter on the side of the center point C of the valve body 4.

Therefore, as the temperature of the exhaust gases is elevated causing the thermal expansion, the circumferential portion of the valve body 4, first, starts coming in contact with the tubular wall of the exhaust gas passage 2 at a position facing the edge portion 9 on the side of the center point C of the valve body 4. In the present invention, recessed portions 11 are formed in the surface of the valve body 4 at the above positions. The recessed portions increase the distance between the edge portions 9 and the circumferential portions of the valve body 4, avoiding the contact between the two and avoiding the biting despite they have been thermally expanded. The recessed portions 11 are formed at positions where the contact is most likely to occur due to the thermal expansion. If the contact does not take place at these portions, then, the contact will not take place at any other circumferential portions.

Figure 3:
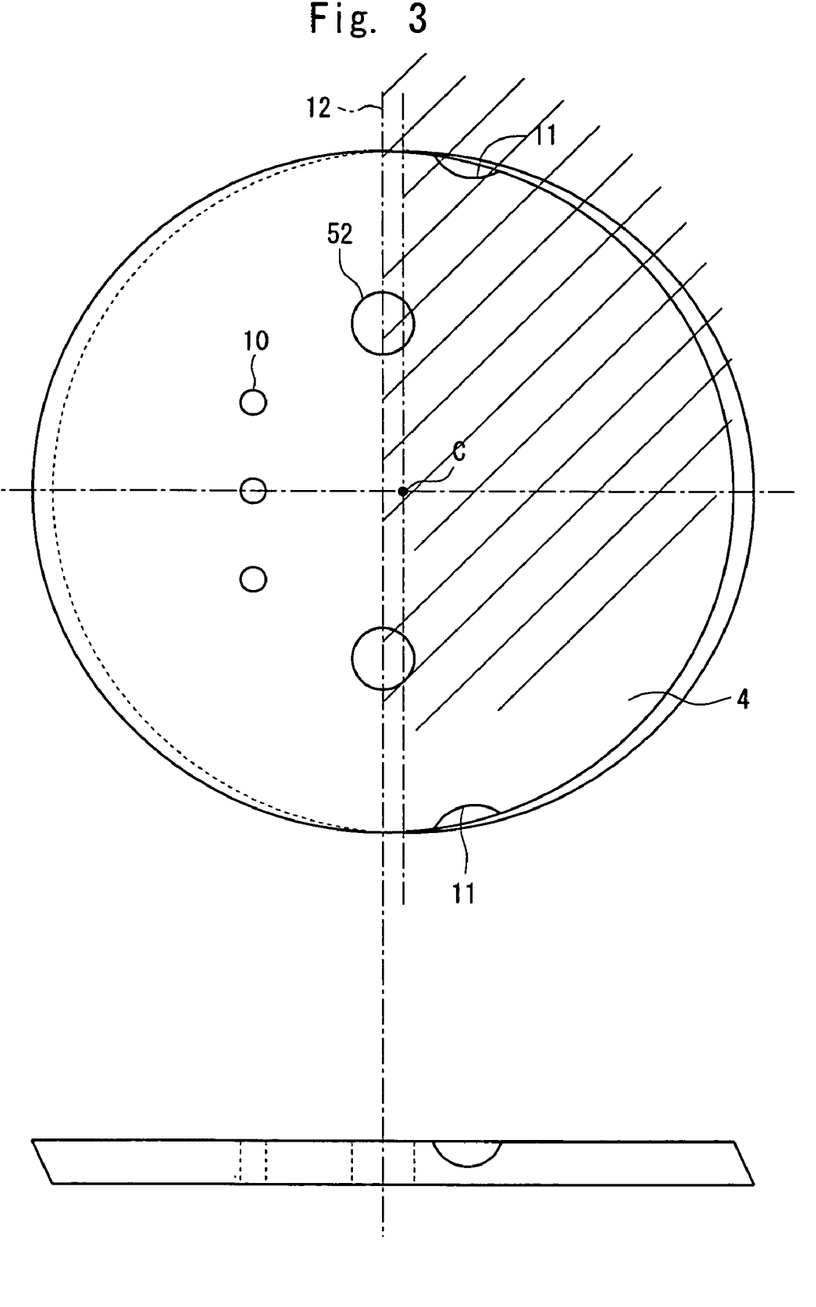
FIG. 3 is a view of a valve body according to the present invention.

FIG. 3 illustrates the shape of the valve body 4 embodying the present invention. The valve body 4 has two holes 52 for inserting the mounting bolts 6 on the center axis 12 of rotation of the valve shaft 5 and, further, has three communication holes 10 perforated therein for discharging the exhaust gases when it is closed. Symbol C represents a center point of the valve body 4 of an elliptic shape and through which the center axis 13 of the exhaust gas passage 2 passes. The area of the hatched portion on the right side of the center axis 12 of rotation is greater than the area of the left side and, therefore, the pressure of the exhaust gases gives a torque to the valve body 4 in a direction in which it opens. The recessed portions 11 are formed at two symmetrical positions in the circumferential portion on the right side of the center axis 12 where the center axis 13 of the exhaust gas passage 2 exists.

Figure 6:
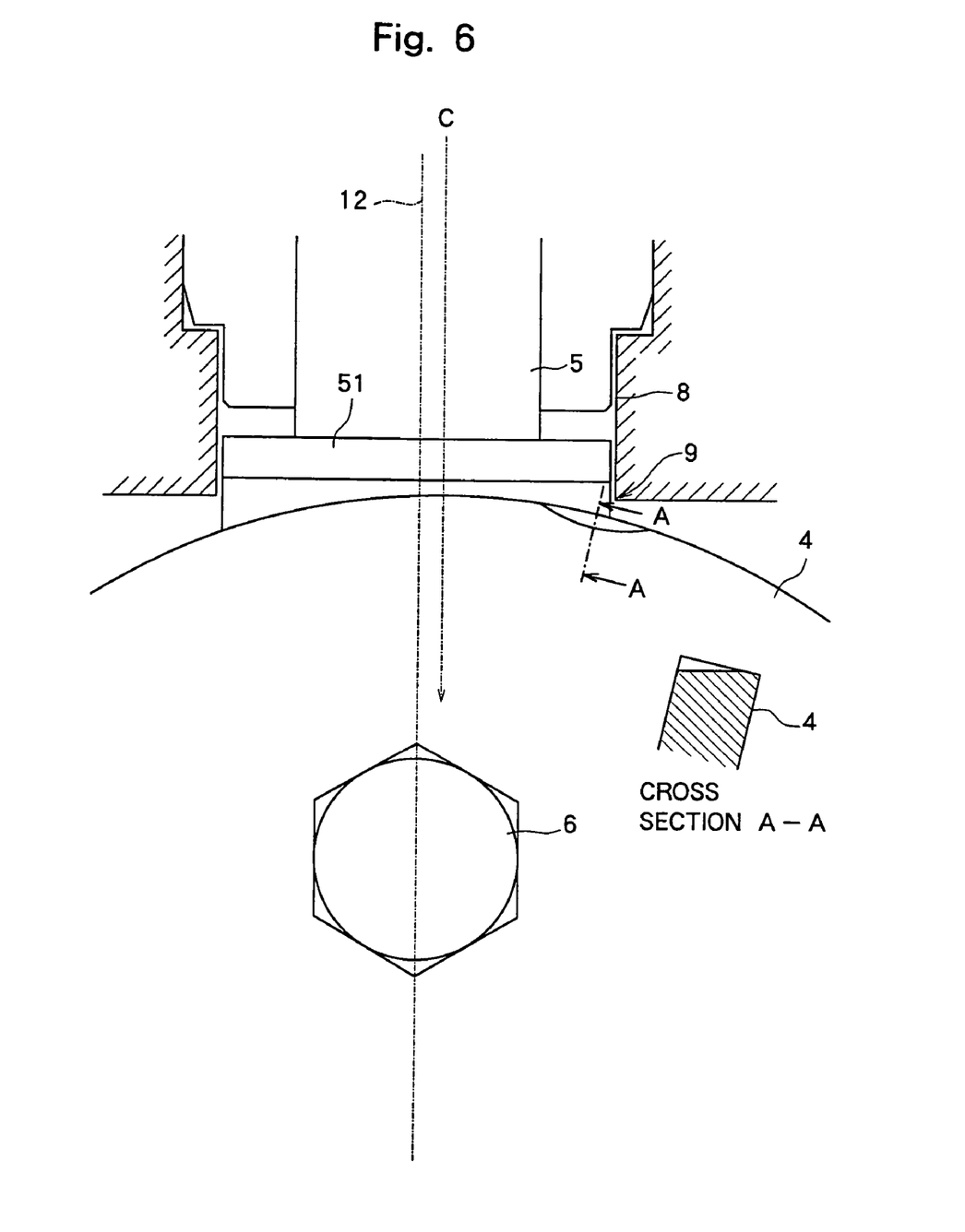
FIG. 6 is a view illustrating, in detail, the vicinity of the edge portions of when the valve body is at the closed position.

FIG. 6 illustrates, on an enlarged scale, the valve body 4 mounted on the rotary shaft 5 and the vicinities of the edge portions 9 where the insertion holes 8 are opened. The recessed portions 11 are formed by cutting the surface of the valve body 4 by using, for example, a circular tool, and have such a shape that they become the deepest at positions where the gap is a minimum between the circumferential portion and the edge portions 9, i.e., the circumferential portion becomes the deepest at positions facing the edge portions 9. As shown in cross section A-A, further, the valve body 4 is not cut by the whole thickness thereof but its circumferential portion is left. When the exhaust gas throttle valve is closed, therefore, the exhaust gases do not flow through these gaps in increased amounts despite of forming the recessed portions 11.

As described above in detail, it is an object of the present invention to prevent the valve body from coming in contact with the tubular wall of the exhaust gas passage despite of the thermal expansion. This object is attained by forming recessed portions in the surface of the valve body of the exhaust gas throttle valve at positions where the valve body comes closest to the tubular wall in its opening/closing operation. It will therefore be obvious that the invention can be applied not only to the exhaust gas throttle valve used together with the device for purifying the exhaust gas but also to the exhaust gas throttle valves in general that are used in the exhaust pipe of the engine, such as the one used as the exhaust brake valve.

What is claimed is:

1. An exhaust gas throttle valve disposed in an exhaust system of an engine, comprising:
    a valve casing having an exhaust gas passage of a circular shape in cross section through which exhaust gases flow,
    insertion holes of a circular shape in cross section formed in a wall portion of said exhaust gas passage,
    a rotary valve shaft fitted into said insertion holes and penetrating through said exhaust gas passage, the center axis of rotation of said valve shaft being set at a position deviated from the center axis of said exhaust gas passage, and,
    a plate-like valve body attached to said valve shaft having two recessed portions symmetrically formed in said valve body by cutting a surface of said valve body by its partial thickness at positions facing edge portions where said insertion holes are opened in said exhaust gas passage, said two recessed portions being formed in the circumferential portion of said valve body on a side of said center axis of said exhaust gas passage beyond said center axis of rotation.

2. An exhaust gas throttle valve according to claim 1, wherein said recessed portions are so shaped that a depth is a maximum at points where the circumferential portion of said valve body faces said edge portions.

3. An exhaust gas throttle valve according to claim 2, wherein communication holes are perforated in said valve body on the side opposite to said center axis of the gas flow passage with said center axis of rotation as a center.

4. An exhaust gas throttle valve according to claim 1, wherein communication holes are perforated in said valve body on the side opposite to said center axis of the gas flow passage with said center axis of rotation as a center.

5. An exhaust gas throttle valve according to claim 1, wherein said engine comprises a diesel engine, a device for purifying the exhaust gas is disposed in the exhaust gas system thereof, the device for purifying the exhaust gases having a catalyst and a diesel particulate filter for trapping the particulate matter in the exhaust gases, and the exhaust gas throttle valve is so operated that its opening degree is decreased when the particulate matter deposited on the diesel particulate filter is to be oxidized and removed for regeneration.

6. An exhaust gas throttle valve according to claim 5, wherein said exhaust gas throttle valve is disposed on the downstream of said device for purifying the exhaust gases.

7. An exhaust gas throttle valve according to claim 5, wherein said engine is mounted on a vehicle, and said exhaust gas throttle valve is so operated that its opening degree decreases during the deceleration operation of the vehicle.

8. An exhaust gas throttle valve according to claim 1, wherein said engine is mounted on a vehicle, and said exhaust gas throttle valve is so operated that its opening degree decreases during the deceleration operation of the vehicle.

* * * * *